United States Patent
Miller

[15] 3,663,288

[45] May 16, 1972

[54] PHYSIOLOGICALLY ACCEPTIBLE ELASTOMERIC ARTICLE

[72] Inventor: Mary Lucy Miller, Alexandria, Va.

[73] Assignee: American Cyanamid Company, Stamford, Conn.

[22] Filed: Sept. 4, 1969

[21] Appl. No.: 855,393

[52] U.S. Cl. ..........................117/7, 117/47 A, 117/138.8 A, 117/139, 117/161 UZ, 128/349, 3/1, 117/138.8 D
[51] Int. Cl. ......................................................A61m 25/00
[58] Field of Search ..................117/7, 139, 47; 128/349; 3/1

[56] References Cited

UNITED STATES PATENTS

| | | | |
|---|---|---|---|
| 3,453,194 | 7/1969 | Bennett et al. | 204/159.12 |
| 2,789,099 | 4/1957 | Rife et al. | 117/161 UZ |
| 3,475,538 | 10/1969 | Bixler et al. | 260/17.4 |
| 3,549,409 | 12/1970 | Dyck | 117/47 |

FOREIGN PATENTS OR APPLICATIONS 22,460  10/1959  Germany..................117/7

OTHER PUBLICATIONS

Sawyer et al., " A New Plastic Interface which has Antithrombotic Characteristics and Appears to Mimic the Vascular Interface," Transactions American Soc. of Artificial Internal Organs, XII, (1966), pp. 183–187.

*Primary Examiner*—William D. Martin
*Assistant Examiner*—D. Cohen
*Attorney*—Frank M. Van Riet

[57] ABSTRACT

There is provided improved synthetic articles of manufacture which are physiologically acceptable when utilized in warm-blooded animals as medical devices. The articles of manufacture comprise extensible substrates coated with poly(acrylic acid) or poly(methacrylic acid).

6 Claims, No Drawings

PHYSIOLOGICALLY ACCEPTIBLE ELASTOMERIC ARTICLE

BACKGROUND OF THE INVENTION

As is well known in the art, plastic articles, such as tubing, threads, or plates, and other materials such as silk, catgut, etc. can be employed in surgical procedures. It is also known that tubing, for example, fabricated from polyesters or a polyhaloethylene, such as polytetrafluoroethylene etc., can be employed as a replacement or reinforcement in warm-blooded animals for a section of (1) blood vessels, (2) sutures, (3) heart valves, or (4) as part replacements or reinforcements in machines handling blood outside of the body. However, such prior art products are not wholly satisfactory for the reason that formation of blood clots readily takes place on the surface of the synthetic members. This is highly dangerous and frequently fatal to the warm-blooded animal, since such precipitation causes thrombosis. In order to overcome this difficulty, it has been a common practice to administer large doses of a blood anticoagulant, such as heparin, intravenously. Unfortunately, the administration of such blood anticoagulant is only temporarily beneficial. It is, therefore, apparent that, if an article of manufacture could be provided as a surgically acceptable replacement in which the clotting or thrombosis formation is markedly lessened or substantially eliminated, such would satisfy a long-felt need.

SUMMARY

It is generally believed that medical devices having some degree of negatively charged substituents on their surface markedly lessen or eliminate blood clotting or thrombus formation in warm-blooded animals. These devices may be used in any suitable form, such as plates, discs, threads, tubings, etc., for use as a physiologically acceptable member which will be in contact with blood.

Elastomeric or extensible polymers, as well as other materials such as polytetrafluoroethylene, have also been utilized, after having been chemically or physically modified to make them physiologically acceptable, as catheters, cannulae, artificial hearts etc. One method of treatment of said polymers to render them useful for said applications is to coat them with poly(acrylic acid) or poly(methacrylic acid), see copending application, Ser. No. 855,413 filed of even date herewith, titled ARTICLE OF MANUFACTURE, by the instant inventor, Singerman and Riley and now abandoned.

The coatings of said application are applied to the surface of the elastomeric polymers when they are in their normal state. The resulting articles, while useful for many applications, are not applicable to situations wherein the article undergoes some degree of distortion during use. That is to say, when the article is stretched etc. during use, surface area fissures develop in the coating or non-coated areas are exposed and thus thrombogenic sections in the article are produced.

I have now discovered that articles can be made more completely non-thrombogenic by extending, i.e., stretching, swelling, or otherwise distorting, etc. the elastomeric material while the coating of poly(acrylic acid) or poly(methacrylic acid) is being applied thereto. Accordingly, the articles produced by my novel invention are not merely non-thrombogenic on the surface thereof but throughout the surface area exposed during distortion thereof. Furthermore, the articles produced by swelling the elastomeric material before treating with the polyacid can be cut, severed, slit, or otherwise fractured without destroying the non-thrombogenicity because the poly(acrylic acid) or poly(methacrylic acid) appears to permeate the entire mass of the elastomer.

A further feature of the novel articles of the present invention is that the articles of manufacture possess the ability to either swell on rewetting in body fluids or not swell at all, depending upon the rubbery polymer coated. Therefore, an organ such as an artificial heart can be sutured because the heart can be made to swell enough to fill the gap made by the suture and thereby prevent blood leakage.

DESCRIPTION OF THE INVENTION INCLUDING PREFERRED EMBODIMENTS

According to the instant invention, a suitably shaped article can be modified so as to render it physiologically acceptable, i.e., non-thrombogenic.

In general, any extensible or semi-rigid material can be employed. The material is preferably manufactured into a shaped member or construction to be used as a medical device (suture, etc.), as mentioned above. Exemplary materials from which the members are formed include elastomeric polymers such as polymers and copolymers derived from diolefin compounds such as butadiene-1,3; isoprene; 2,3-dimethylbutadiene-1,3; piperylene; heptadiene-1,3; 2-methylpentadiene-1,5 and the like. The elastomeric material may consist of natural rubber or a synthetic rubbery diolefin homopolymer, although the diolefin rubber may contain a minor amount, i.e., up to about 40 percent of a compound such as styrene, vinyl toluene, an acrylate, etc. Thus, such materials as styrene-butadiene rubbers, butadiene-acrylonitrile rubbers, neoprene rubber, butyl rubbers, silicone rubbers, polybutadiene rubbers, polyacrylate rubbers, etc. may be used. Such rubbers as those produced from polyurethane polymers, siloxanes, etc. may also be utilized. The materials may be treated according to the instant invention in the form of heart valves, discs, tubing, rings, strips, plates, rods, etc. or shaped as organs of warm-blooded animals. They may also be in the shape of a part of extracorporeal mechanical device which comes into contact with blood, such as a heart-lung machine.

When stretching or otherwise distorting the elastomeric material preparatory to coating with the polymeric acid, it is beneficial to extend the elastomer as near as possible to its fullest extent. In this way, substantially complete coverage of all exposed surface area can be achieved and subsequent distortion of the finished article will not destroy the non-thrombogenic property thereof.

The preferred method of forming the articles of manufacture of the instant invention is by swelling the elastomeric material to substantially its fullest extent in a swelling agent such as benzene, toluene, xylene, etc., the particular swelling agent for the particular material being well known to the skilled artisan. The swelled article is then immersed in a solution of the poly(acrylic acid) or poly(methacrylic acid) and the dipped device is then dried. Alternatively, our novel articles can be prepared by polymerization of the monomeric acrylic or methacrylic acid, utilizing known polymerization techniques, in the presence of the device. After polymerization, the coated device is removed from the reaction media, wiped of excess polymer and dried. As mentioned above, stretching, elongating or otherwise distorting the elastomeric substrate during the coating procedure may also be substituted for the swelling procedure, the treatment of such distorted substrate with the polymeric acid being identical to that set forth above for the swelled substrate.

The novel products of the present invention, as mentioned above, are physiologically acceptable to warm-blooded animals. That is to say, articles are produced which are non-toxic when implanted into or contacted with tissue in warm-blooded animals. Furthermore, they are non-thrombogenic when in contact with blood or blood components, even after a reasonably extended period of time. As such, my novel devices are medically and surgically beneficial during the course of treatment of warm-blooded animals, as prescribed by conventional medical practice.

The following examples are set forth for purposes of illustration only and are not to be construed as limitations on the present invention except as set forth in the appended claims. All parts and percentages are by weight unless otherwise specified.

EXAMPLE 1

A tube of a commercially available dimethylsiloxane rubber (0.077 mm outside diameter and 0.058 mm inside diameter) is placed in benzene, sufficient in amount to fully cover the tube when swollen. After the rubber tube is fully swollen, one part of inhibitorafree methacrylic acid and 0.015 part of benzoyl peroxide are added for every nine parts of solvent. The mixture is deoxygenated with a stream of nitrogen, sealed in a suitable glass vessel and exposed to a temperature of 85°–90° C for 1 to 2 hours. The vessel is then opened and the treated rubber tubing placed immediately in water, washed well and dried. The tubing is then tested as a catheter in a dog. No thrombosis is evident after 1 month even at a point where the tubing was cut across its width.

EXAMPLE 2

The procedure of Example 1 is again followed except that acrylic acid monomer is utilized as the coating formed by polymerization thereof. Again, a non-thrombogenic catheter is recovered.

EXAMPLE 3

The procedure of Example 1 is again followed except that the catheter is made of a commercially available yellow rubber of the type used to make artificial hearts. Similar results are obtained.

EXAMPLE 4

The procedure of Example 1 is followed except that the catheter is made from a tube of a commercially available red butyl rubber. Again a coated catheter is recovered which shows no evidence of thrombus formation when in contact with blood.

EXAMPLE 5

The procedure of Example 2 is again followed except that the catheter is made of a commercially available brown silicone rubber. Similar results are observed.

EXAMPLE 6

Example 2 is again followed except that a commercially available polyurethane rubber is used and the rubber is stretched instead of swollen. Again a non-thrombogenic catheter is recovered.

EXAMPLE 7

A commercially available butadiene/styrene rubber in the form of a heart valve is immersed in toluene and fully swollen. The swollen article is removed and placed in a vessel containing a solution of poly(acrylic acid). After 2 hours the article is removed, carefully wiped dry of polymer and allowed to dry further in air. Upon immersion in a pool of blood for 15 minutes with continual distortion thereof being effected, no thrombus formation is observed.

EXAMPLE 8

The procedure of Example 7 is again followed except that poly(methacrylic acid) solution is utilized and the heart valve is prepared from polybutadiene. Similar results are achieved.

EXAMPLE 9

Again following the procedure of Example 7 except that the butadiene/styrene rubber is stretched fully upon immersion in the poly(acrylic acid) solution, similar results are observed.

I claim:

1. A physiologically acceptable, synthetic, medical article of manufacture comprising an extendable, elastomer substrate having poly(acrylic acid) or poly(methacrylic acid) on the surface thereof including that surface exposed when the substrate is extended or fractured.

2. An article of manufacture according to claim 1 in the form of a catheter.

3. An article of manufacture according to claim 1 wherein said coating is poly(acrylic acid).

4. An article of manufacture according to claim 2 wherein said coating is poly(acrylic acid).

5. An article of manufacture according to claim 1 wherein said coating is poly(methacrylic acid).

6. An article of manufacture according to claim 2 wherein said coating is poly(methacrylic acid).

* * * * *